United States Patent
Herte

(10) Patent No.: US 12,476,289 B2
(45) Date of Patent: Nov. 18, 2025

(54) MODULAR BATTERY

(71) Applicant: Dustin Jay Herte, Verona, WI (US)

(72) Inventor: Dustin Jay Herte, Verona, WI (US)

(73) Assignee: Blue Line Battery, Inc., Whitewater, WI (US)

( * ) Notice: Subject to any disclaimer, the term of this patent is extended or adjusted under 35 U.S.C. 154(b) by 424 days.

(21) Appl. No.: 17/517,550

(22) Filed: Nov. 2, 2021

(65) Prior Publication Data
US 2022/0140407 A1     May 5, 2022

Related U.S. Application Data

(60) Provisional application No. 63/198,674, filed on Nov. 3, 2020.

(51) Int. Cl.
*H01M 10/42*     (2006.01)
*H01M 10/0525*     (2010.01)
(Continued)

(52) U.S. Cl.
CPC ....... *H01M 10/425* (2013.01); *H01M 50/209* (2021.01); *H01M 50/244* (2021.01);
(Continued)

(58) Field of Classification Search
CPC ............. H01M 50/258; H01M 10/425; H01M 2010/4271
See application file for complete search history.

(56) References Cited

U.S. PATENT DOCUMENTS

| 3,887,396 A | 6/1975 | Walsh et al. |
| 5,242,763 A | 9/1993 | Konishi et al. |
(Continued)

FOREIGN PATENT DOCUMENTS

| JP | 2012009311 A | * | 1/2012 |
| JP | 2014135235 A | | 7/2014 |
(Continued)

OTHER PUBLICATIONS

Machine Translation of RU 199889u1 (Year: 2020).*
Machine Translation of JP 2017111899A (Year: 2017).*
Abstract of JP 2012009311A (Year: 2012).*

*Primary Examiner* — Gregg Cantelmo
(74) *Attorney, Agent, or Firm* — Reinhart Boerner Van Deuren P.C.

(57) ABSTRACT

A modular battery is provided. The modular battery includes a casing having sidewalls and a bottom wall defining an interior cavity. The modular battery also includes a plurality of energy cells disposed within the interior cavity, and each energy cell of the plurality of energy cells includes at least one lithium ion cell module. Further, the modular battery includes at least one battery management system (BMS) cell disposed within the interior cavity, and the at least one BMS cell is configured to coordinate input of electrical energy into and output of electrical energy from the plurality of energy cells. A wiring harness electrically connects the plurality of energy cells and the at least one BMS cell. In the modular battery, each energy and BMS cell is individually insertable and removable from the interior cavity without insertion or removal of any other energy or BMS cell.

16 Claims, 15 Drawing Sheets

(51) Int. Cl.
*H01M 50/209* (2021.01)
*H01M 50/244* (2021.01)
*H01M 50/258* (2021.01)
*H01M 50/502* (2021.01)
*H01M 50/569* (2021.01)

(52) U.S. Cl.
CPC ....... *H01M 50/258* (2021.01); *H01M 50/502* (2021.01); *H01M 50/569* (2021.01); *H01M 10/0525* (2013.01); *H01M 2010/4271* (2013.01)

(56) References Cited

U.S. PATENT DOCUMENTS

| | | | |
|---|---|---|---|
| 5,328,778 | A | 7/1994 | Woodruff et al. |
| 5,445,099 | A | 8/1995 | Rendina |
| 5,666,029 | A | 9/1997 | McDonald |
| 5,811,938 | A | 9/1998 | Rodriguez |
| 5,814,971 | A | 9/1998 | Johnson |
| 6,225,708 | B1 | 5/2001 | Furukawa et al. |
| 6,297,616 | B1 | 10/2001 | Kubo et al. |
| 6,368,743 | B1 * | 4/2002 | Guerin ................. F15B 15/068 429/159 |
| 6,571,722 | B2 | 6/2003 | Motsenbocker et al. |
| 6,708,638 | B2 | 3/2004 | Thomson |
| 6,770,399 | B2 | 8/2004 | Umeno et al. |
| 7,211,983 | B2 | 5/2007 | Queveau et al. |
| 7,824,063 | B2 | 11/2010 | Frick |
| 7,880,391 | B2 | 2/2011 | Bakre et al. |
| 7,927,740 | B2 | 4/2011 | Inagaki et al. |
| 8,111,035 | B2 | 2/2012 | Nishino et al. |
| 8,119,288 | B2 | 2/2012 | Zhamu et al. |
| 8,445,139 | B2 | 5/2013 | Hosaka et al. |
| 8,629,574 | B2 | 1/2014 | Porter et al. |
| 8,640,629 | B2 | 2/2014 | Barbee et al. |
| 8,709,623 | B2 | 4/2014 | Choi et al. |
| 8,877,361 | B2 | 11/2014 | Byun et al. |
| 8,895,197 | B2 | 11/2014 | Friesen et al. |
| 8,968,895 | B2 | 3/2015 | Hoerpel et al. |
| 9,321,433 | B2 | 4/2016 | Yin et al. |
| 9,774,060 | B2 | 9/2017 | Kim et al. |
| 9,871,234 | B2 | 1/2018 | Pendry |
| 10,181,740 | B2 | 1/2019 | Tanaka et al. |
| 10,608,235 | B2 | 3/2020 | Doe et al. |
| 2006/0057433 | A1 | 3/2006 | Ando et al. |
| 2006/0134514 | A1 * | 6/2006 | Lenain ................. H01M 10/647 429/120 |
| 2008/0011553 | A1 * | 1/2008 | Mielke ................. H01M 50/233 187/222 |
| 2008/0050645 | A1 * | 2/2008 | Kai ...................... H01M 10/482 429/93 |
| 2009/0283024 | A1 | 11/2009 | Robertson |
| 2011/0045335 | A1 * | 2/2011 | Lee ...................... H01M 50/509 429/153 |
| 2011/0181234 | A1 | 7/2011 | Branham |
| 2011/0300429 | A1 | 12/2011 | MsWhorter |
| 2012/0208050 | A1 | 8/2012 | Chen |
| 2013/0183544 | A1 | 7/2013 | Yoshioka et al. |
| 2013/0273412 | A1 * | 10/2013 | Okada ................. H01M 10/482 429/158 |
| 2014/0220461 | A1 | 8/2014 | Okazaki |
| 2015/0030889 | A1 * | 1/2015 | Kawaguchi ......... H01M 50/209 429/7 |
| 2016/0020618 | A1 | 1/2016 | Yang et al. |
| 2016/0336806 | A1 | 11/2016 | Tsuda et al. |
| 2017/0170438 | A1 * | 6/2017 | Jansen ................. H01M 50/224 |
| 2017/0259693 | A1 | 9/2017 | Kirk et al. |
| 2018/0351144 | A1 * | 12/2018 | Huff ..................... H01M 50/503 |
| 2019/0103639 | A1 | 4/2019 | Guglielmo et al. |
| 2019/0198933 | A1 | 6/2019 | Newhouse et al. |
| 2019/0380187 | A1 | 12/2019 | Hsia |

FOREIGN PATENT DOCUMENTS

| | | | |
|---|---|---|---|
| JP | 2017111899 A * | 6/2017 | ............. H01M 2/10 |
| KR | 10-2015-0076913 A | 7/2015 | |
| KR | 10-2019-0079161 A | 7/2019 | |
| RU | 199889 U1 * | 9/2020 | |
| TW | I703757 B | 9/2020 | |
| WO | WO 2013/059115 A1 | 4/2013 | |
| WO | WO 2020/112618 A1 | 6/2020 | |

* cited by examiner

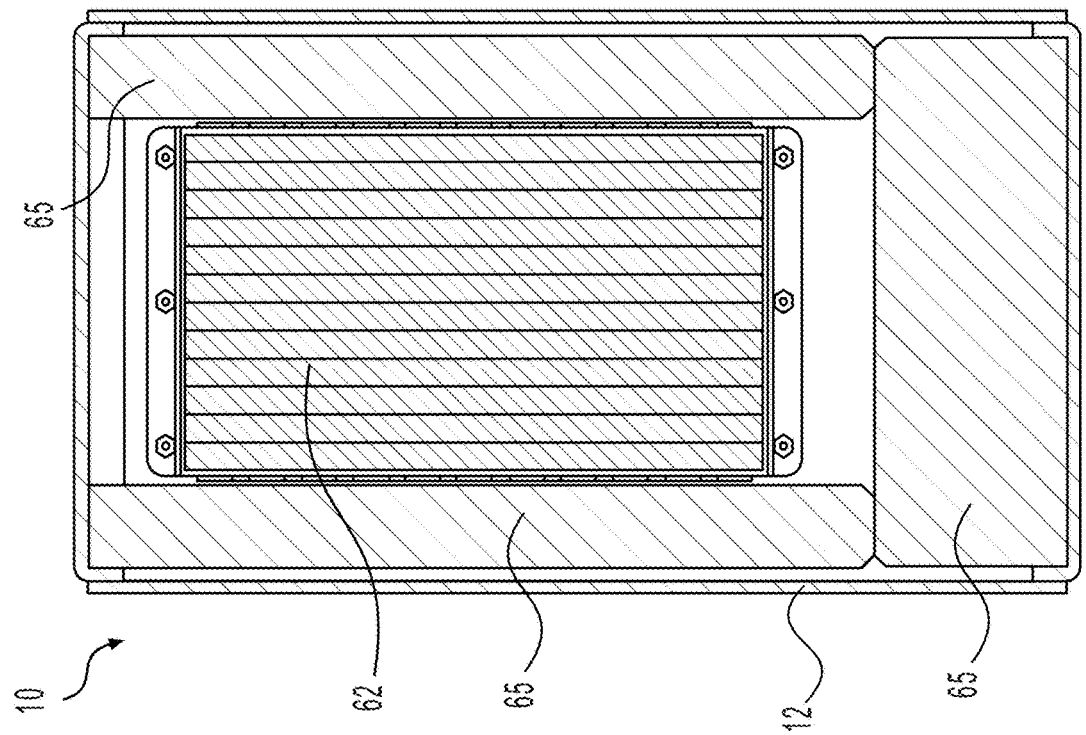
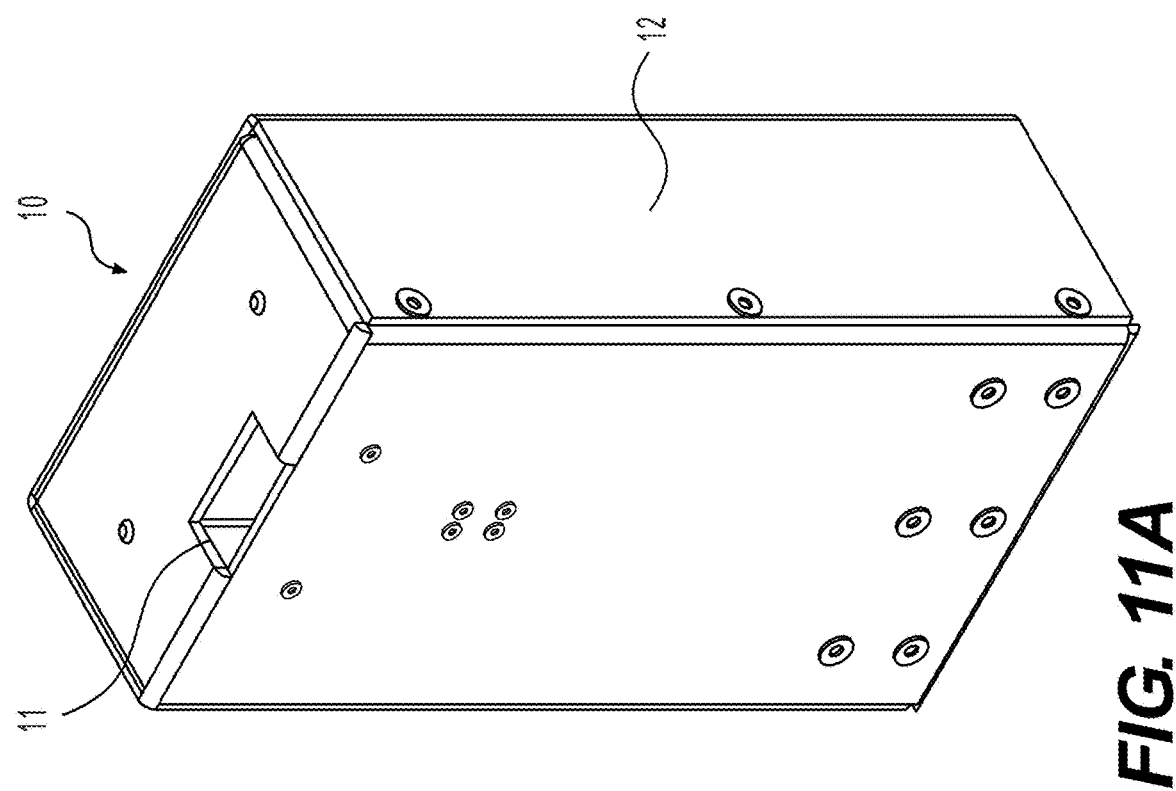
FIG. 11B
FIG. 11A

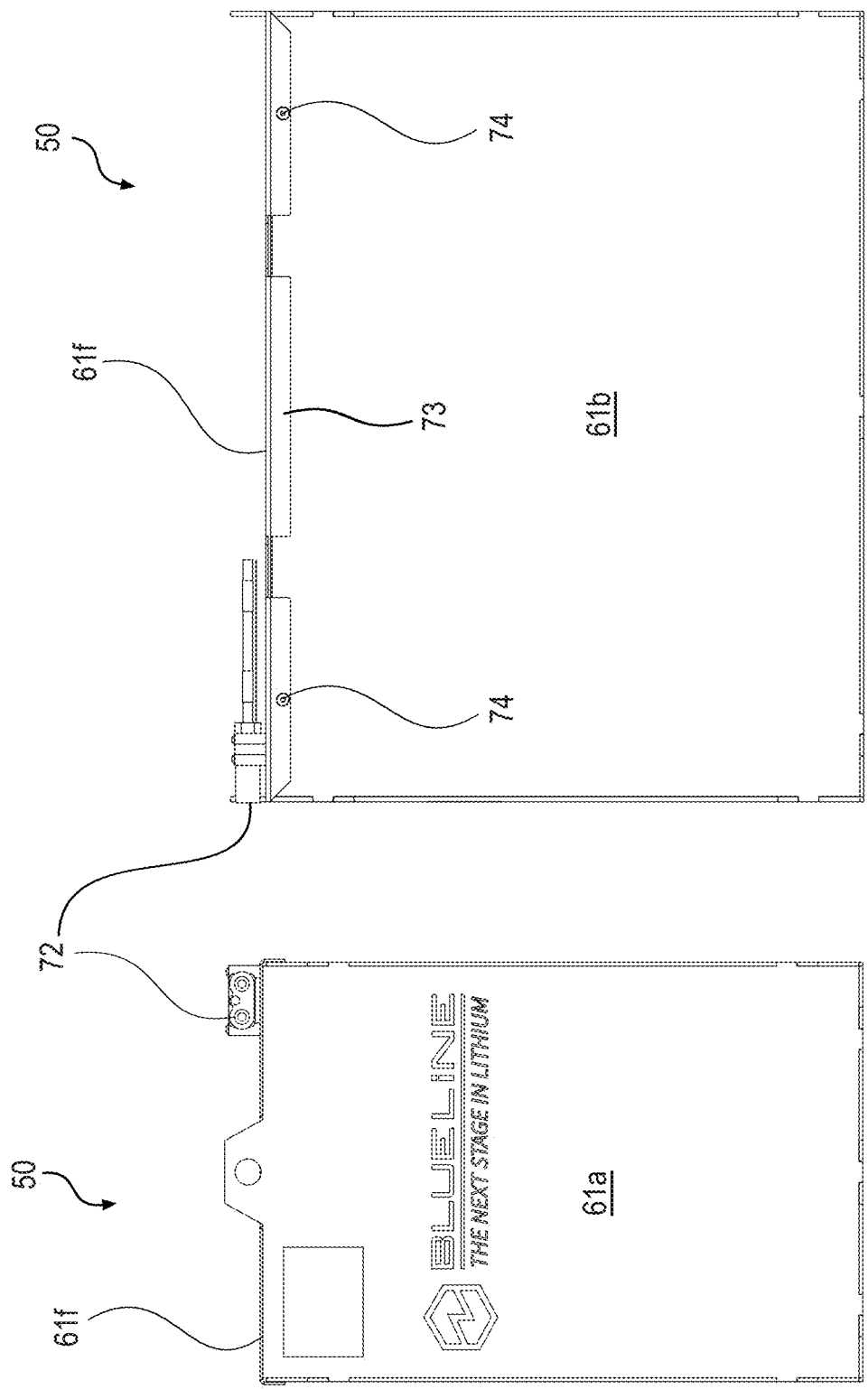

MODULAR BATTERY

CROSS-REFERENCE TO RELATED PATENT APPLICATIONS

This patent application claims the benefit of U.S. Provisional Patent Application No. 63/198,674, filed Nov. 3, 2020, the entire teachings and disclosure of which are incorporated herein by reference thereto.

BACKGROUND OF THE INVENTION

The present invention relates to battery cells and, more particularly, to a ballasted lithium-ion battery cell for use in industrial equipment.

There are many applications where a battery must have a minimum weight. Other conventional cells do not include counterweights, and so batteries must be weighted separately, or equipment must have a separate counterweight added if a battery cannot contain the counterweight. The requirement of adding counterweight separately of the lithium-ion cell adds design and manufacturing complexity.

In view of the foregoing, Applicant has identified a need for a modular battery cell that solves the above problems.

BRIEF SUMMARY OF THE INVENTION

In one aspect, embodiments of the present disclosure provide a modular battery. The modular battery includes a casing having sidewalls and a bottom wall defining an interior cavity. The modular battery also includes a plurality of energy cells disposed within the interior cavity, and each energy cell of the plurality of energy cells includes at least one lithium ion cell module. Further, the modular battery includes at least one battery management system (BMS) cell disposed within the interior cavity, and the at least one BMS cell is configured to coordinate input of electrical energy into and output of electrical energy from the plurality of energy cells. A wiring harness electrically connects the plurality of energy cells and the at least one BMS cell, and (optionally) a ballast element is disposed within the interior cavity. In the modular battery, each energy cell of the plurality of energy cells and each BMS cell of the at least one BMS cell are individually insertable and removable from the interior cavity without insertion or removal of any other energy cell of the plurality of energy cells or any other BMS cell of the at least one BMS cell.

In another aspect, embodiments of the present disclosure provide an energy cell. The energy cell includes an exterior case having an interior. At least one lithium ion cell module is disposed on the interior of the exterior case. Further, ballast weight is disposed on the interior of the exterior case and around the at least one lithium ion cell module.

In yet another aspect, the invention provides a method of assembling a modular battery. In the method, a plurality of energy cells and at least one BMS cell are inserted in an interior cavity of a casing. Each energy cell of the plurality of energy cells includes at least one lithium ion cell module. Further, the at least one BMS cell is configured to coordinate input of electrical energy into and output of electrical energy from the plurality of energy cells. In the method, the plurality of energy cells and the at least one battery management system cell are connected with a wiring harness. In one or more embodiments, each energy cell of the plurality of energy cells and each BMS cell of the at least one BMS cell are individually insertable in the interior cavity.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 11A-11D depict an embodiment of a ballasted energy cell, according to an example embodiment of the present disclosure; and FIGS. 12A-12E depict an embodiment of a battery system including a top wall and a plurality of ballast bars, according to an example embodiment.

Figure 1A:
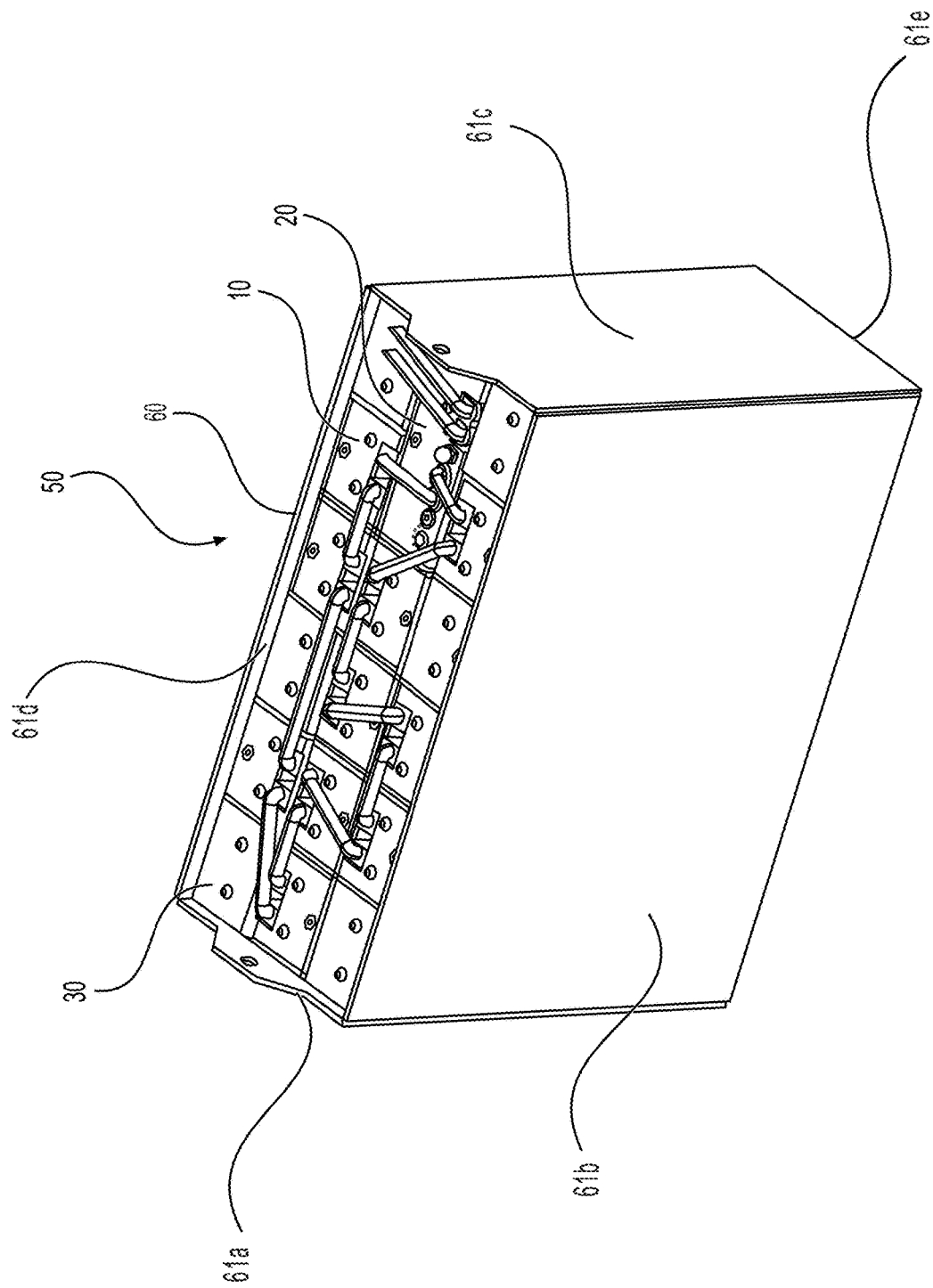
FIGS. 1A-1E depict perspective views of battery systems having a variety of shapes and sizes, according to example embodiments of the present disclosure.
Figure 1C:
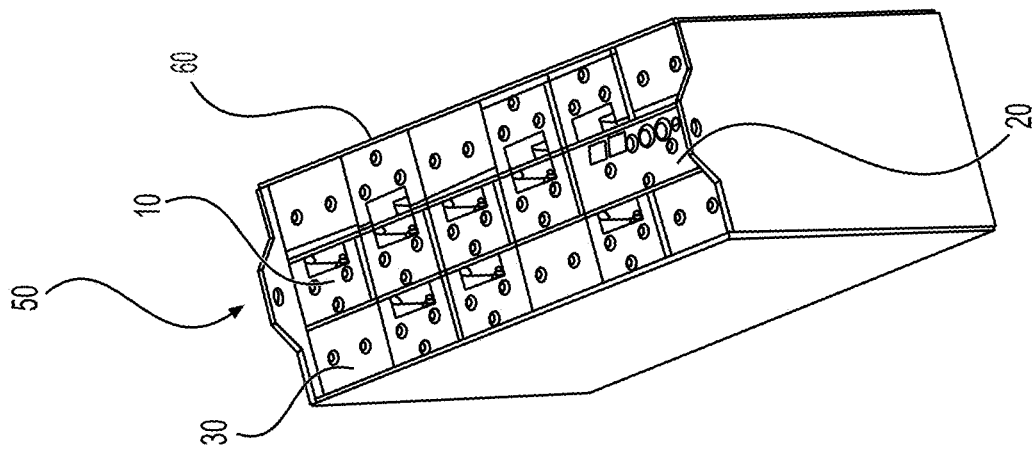
Figure 1B:
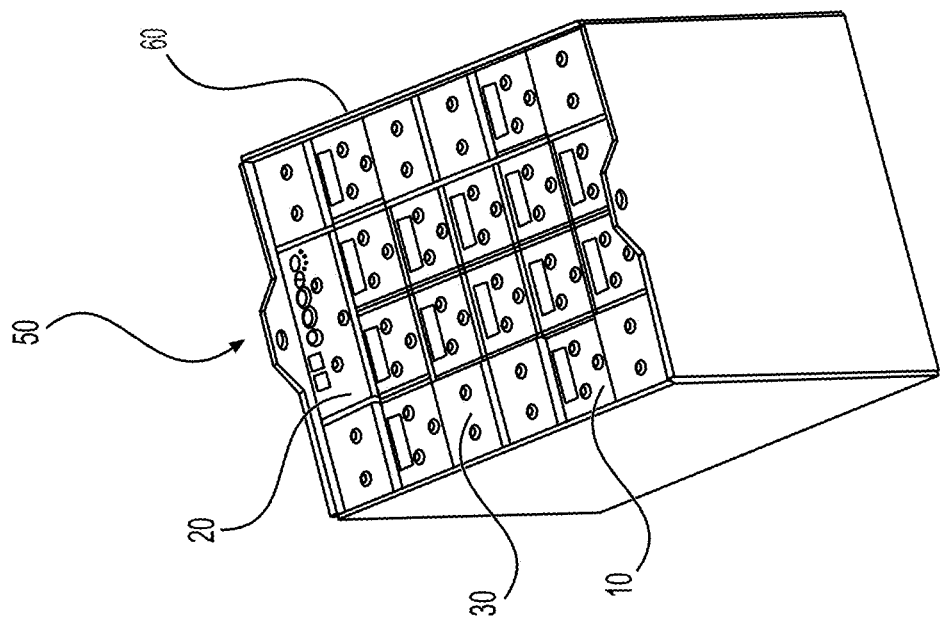

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The following detailed description is of the best currently contemplated modes of carrying out exemplary embodiments of the present invention. The description is not to be taken in a limiting sense but is made merely for the purpose of illustrating the general principles of the present invention.

Broadly, embodiments of the present disclosure provide a modular battery as described herein. Embodiments of the presently disclosed modular battery include a lithium-ion cell module containing paralleled cells and an optionally provided ballast/counterweight, as well as a connection method. This design uniquely incorporates counterweights/ballasts with the lithium-ion cell and a battery management system (BMS) cell, combining the two in a casing. The complexity of adding a separate counterweight is removed due to the additional mass added within the casing of the presently disclosed modular battery.

Referring now to FIGS. 1-10, the present invention relates to a modular lithium-ion battery design. As shown in FIGS. 1A-1E, a battery system 50 is constructed from a combination of a plurality of energy cells 10, at least one BMS cell 20, and (optionally) at least one ballast element (depicted as ballast cell 30) disposed within an interior cavity of a casing 60. Because of the unique design, the end user may configure a counterweighted battery (for use, for example, with forklifts) at a variety of voltages ranging from 12V to 80V or more, from the same type of cell. In certain embodiments that include the ballast element, the battery system 50 includes the energy cells 10 and BMS cells 20, and the at least one ballast element may be separate from the energy cells 10 and the BMS cell 20 and/or incorporated into one or more of the energy cells 10 and the BMS cell 20. For example, the battery system 50 may include separate ballast elements, shown as individual ballast cells 30 in FIGS. 1A-1D. However, as shown in FIG. 1E, the battery system 50 may contain only the plurality of energy cells 10 and the at least one BMS cell 20.

As shown in FIG. 1A, the casing 60 includes a plurality of sidewalls 61*a-d* and a bottom wall 61*e*. Additionally, in certain embodiments, the casing 60 includes a separate top wall, which is not depicted in order to show the interior cavity and contents of the casing 60. In such embodiments, the top wall may be reversibly or permanently attached to any one or more of the sidewalls 61*a-d* or to one or more of the cells 10, 20, 30, in particular the ballast cells 30, in the interior cavity. The sidewalls 61*a-d* of the casing 60, as shown in FIGS. 1A-1D, define a rectangular perimeter of the casing 60, and as shown in FIGS. 1A-1D, the size of the rectangular perimeter can vary depending on the size of the equipment powered by the battery system 50. Additionally, the size and shape of the casing 60 may vary depending on the space available for the casing 60 in its given installation. For example, if the battery system 50 is powering a forklift, the size and the shape of the battery compartment on the forklift may dictate the size and shape of the casing 60 for the battery system 50. In other embodiments, the casing 60 does not have a rectangular perimeter, and the sidewalls may define another curved or polygonal shape.

Figure 2:
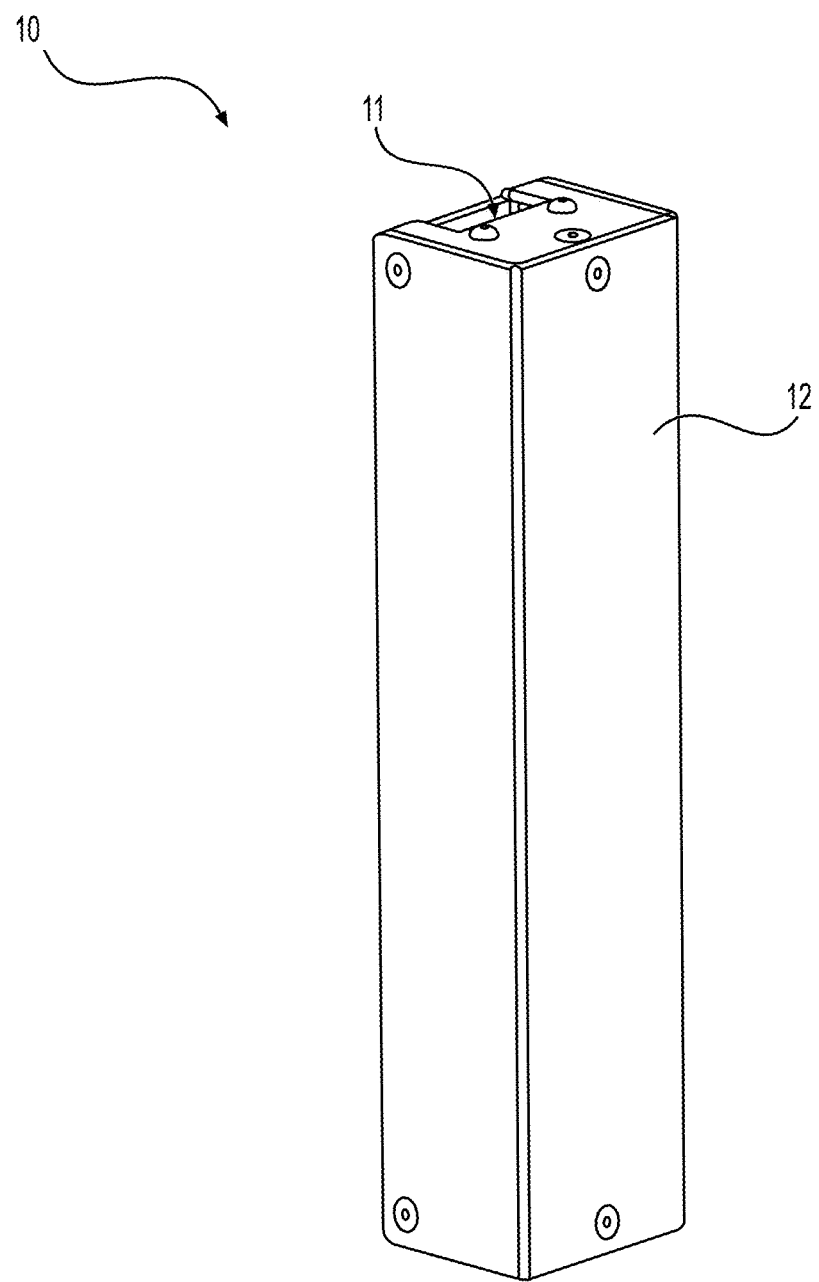
FIG. 2 is a perspective view of an energy cell, according to an example embodiment of the present disclosure.
Figure 3:
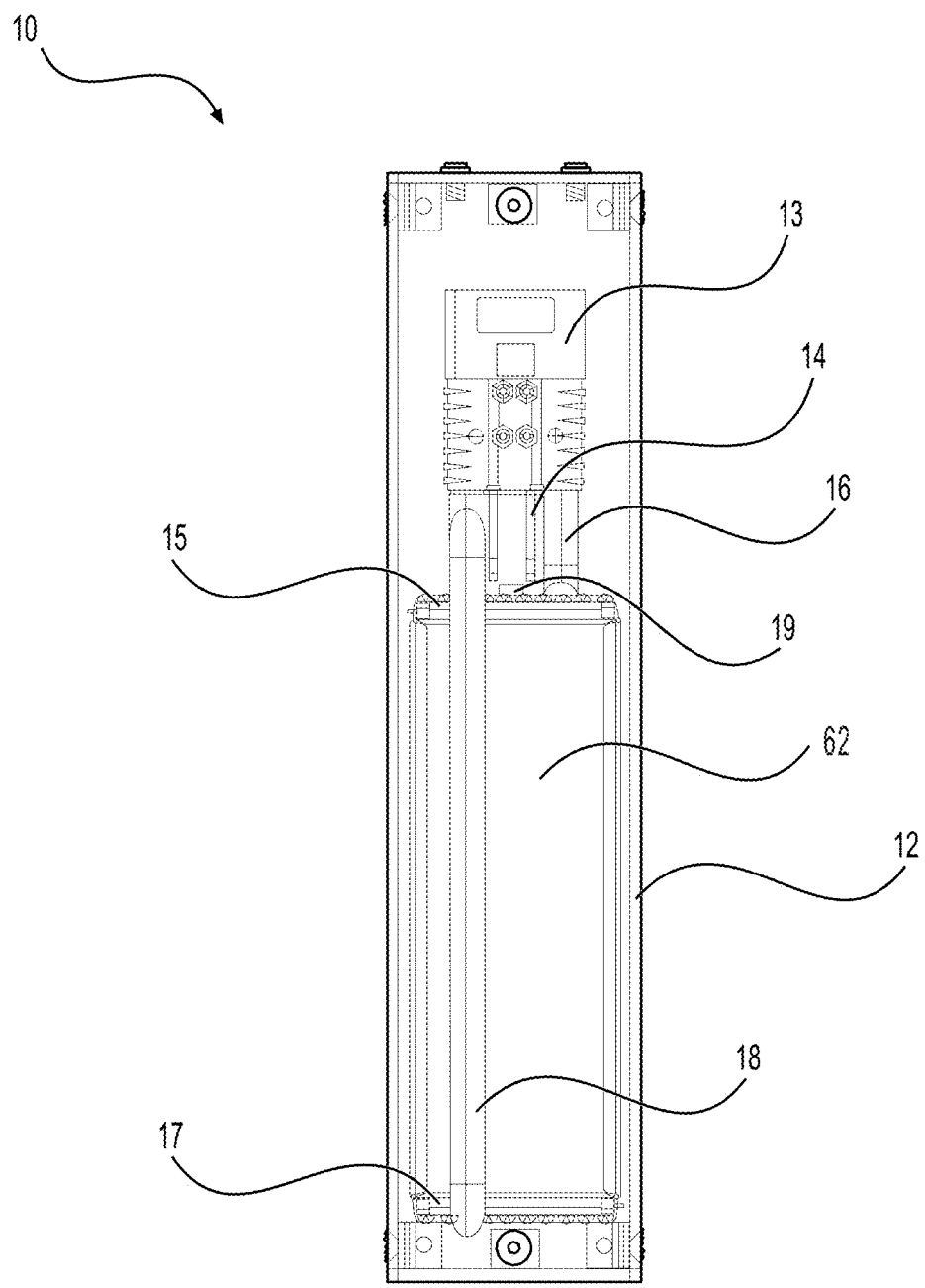
FIG. 3 is a cross-sectional view of the energy cell of FIG. 2, according to an example embodiment of the present disclosure.

FIG. 2 depicts an exterior view of an energy cell 10 according to an exemplary embodiment. Each energy cell 10 includes a plugging point 11 and a protective exterior case 12. The plugging point 11 includes an opening through the exterior case 12 to provide a location for the power connection, and in one or more embodiments, the plugging point 11 may include a temperature sensor or other sensors. The protective exterior case 12 may be formed from a metal, such as steel, or from various types of plastic. As shown in FIG. 3, the energy cell 10 may further include a plug receptacle 13 accessed through the plugging point 11 (as shown in FIG. 2) to allow external connections. The plug receptacle 13 is in electrical communication with a first terminal wire 16 connected to a first battery terminal 15 and a second terminal wire 18 connected to a second battery terminal 17. Disposed between the battery terminals 15, 17 are one or more lithium ion cell modules 62. The lithium ion cell modules 62 produce electrical energy through the movement of lithium ions between an anode and a cathode within each cell module 62. In one or more embodiments, the lithium ion cell modules 62 are connected in parallel between the terminals 15, 17.

In one or more embodiments, the energy cell 10 may also include thermal sensor wires 14 and a temperature sensor 19. In one or more embodiments, the thermal sensor wires 14 may provide temperature information to the BMS cell 20 for management of the energy cell 10. According to certain embodiments, the temperature sensor 19 may be embodied as a "snap switch" to turn the contactor/transistor power off if overheating occurs.

Figure 4:
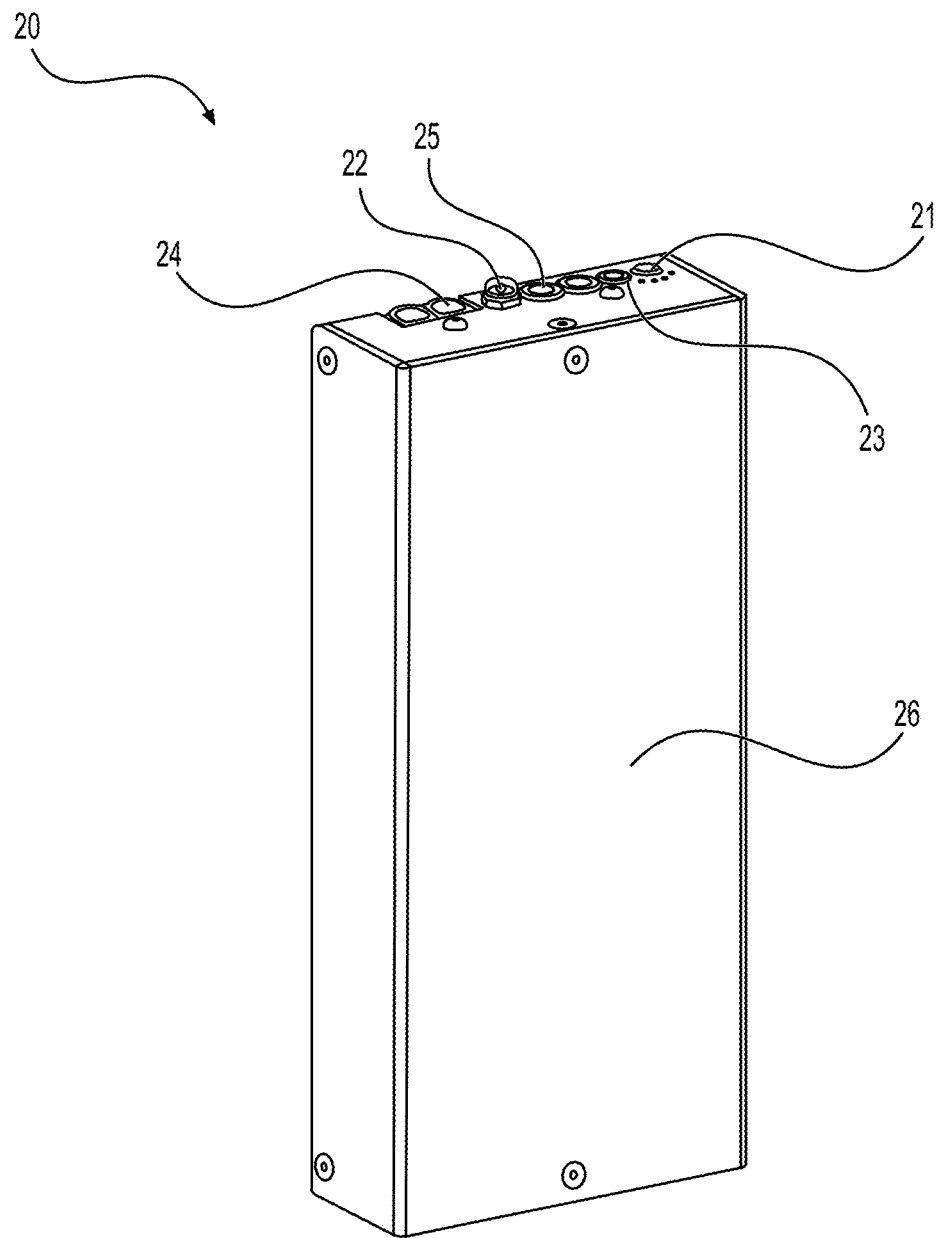
FIG. 4 is a perspective view of a battery management system (BMS) cell, according to an example embodiment of the present disclosure.

FIG. 4 depicts an embodiment of an exterior of a BMS cell 20 according to an exemplary embodiment. In one or more embodiments, the BMS cell 20 includes a BMS balance wire output 23, a power input/output port 24, and a battery port 25. The power input/output port 24 provides external connection to the system powered by the battery system 50 or to a charger for charging the battery system 50. In one or more embodiments, the power input/output port 24 may be configured to receive a single plug as shown in FIG. 4, and in one or more other embodiments, separate power input and power output ports may be provided to receive separate power input and power output cables. The battery port 25 is connected to the energy cells 10 and is configured to receive electrical energy from or distribute electrical energy to the energy cells 10. In one or more embodiments, the balance wire output 23 is configured to balance the output of the energy cells 10 to provide a consistent voltage output for the battery system 50. In one or more embodiments, the BMS cell 20 may be configured to provide active or passive balancing of the energy cells 10 through the balance wire output 23.

In one or more embodiments, the BMS cell 20 may also include a switch with status lights 21 and a data connection port 22. The switch and status lights 21 may allow for reset of the BMS cell 20 with the status lights indicating a current state of the BMS cell 20. The data connection port 22 may allow for collection of diagnostic and performance information regarding operation of the BMS cell 20.

As shown in FIG. 4, the BMS cell also includes a protective exterior case 26. Like the energy cell 10, the protective exterior case 26 may be formed from any suitable metal or plastic material.

Figure 5:
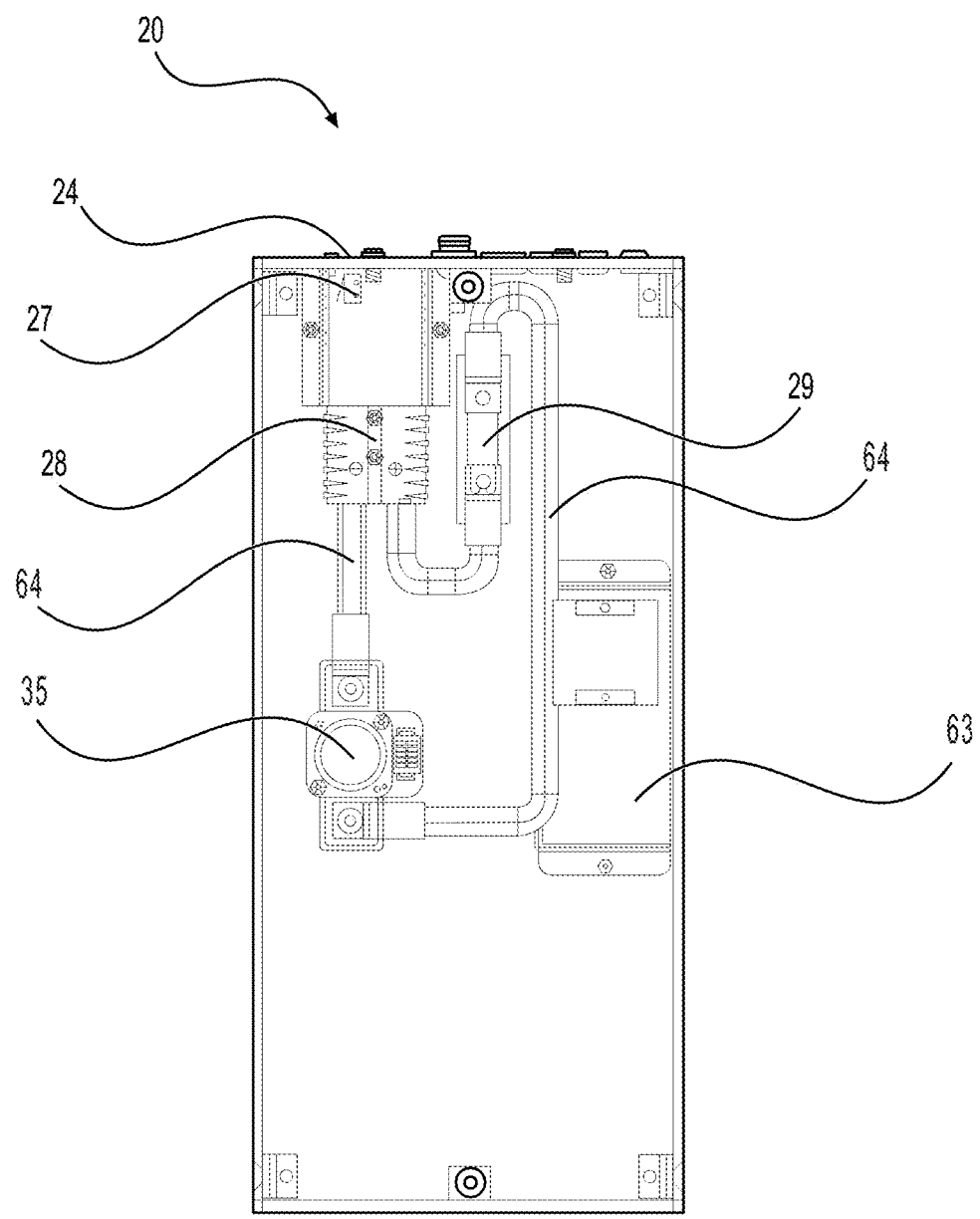
FIG. 5 is a cross-sectional view of the BMS cell of FIG. 4, according to an example embodiment of the present disclosure.

FIG. 5 depicts an interior view of a BMS cell according to an exemplary embodiment. In one or more embodiments, the BMS cell 20 may include a battery management system control board 63 configured to, e.g., actively or passively balance the energy cells, monitor operating temperature, protect against over-current or over- (or under-) voltage conditions, and provide information (e.g., through data connection port 22) regarding the state and performance of the battery system 50. Such battery management control boards 63 are known in the art (for example, Orion Jr. BMS2, available from Ewert Energy Systems, Inc., Carol Stream, IL). The battery management system control board 63 is connected to the battery port 25 to receive electrical energy (in a discharge mode) from the plurality of energy cells 10 and manage their operation. The battery management system control board 63 provides (in a discharge mode) the electrical energy output to a plug receptacle 28 of the power input/output port 24. In a charge mode, the battery management system control board 63 receives electrical energy through the power input/output port 24 and distributes it through the battery port 25 to the energy cells 10 to charge them.

In one or more embodiments, a relay 35 and a fuse 29 may be provided intermediate of the battery management control board 63 and the power input/output port 24 to protect the BMS cell 20 from over-voltage or over-current. In one or more embodiments, the BMS cell 20 may also include a limit switch 27 positioned adjacent to an input/output power plug 28. A plurality of wires 64 connect the components of the BMS cell 20.

Figure 6:
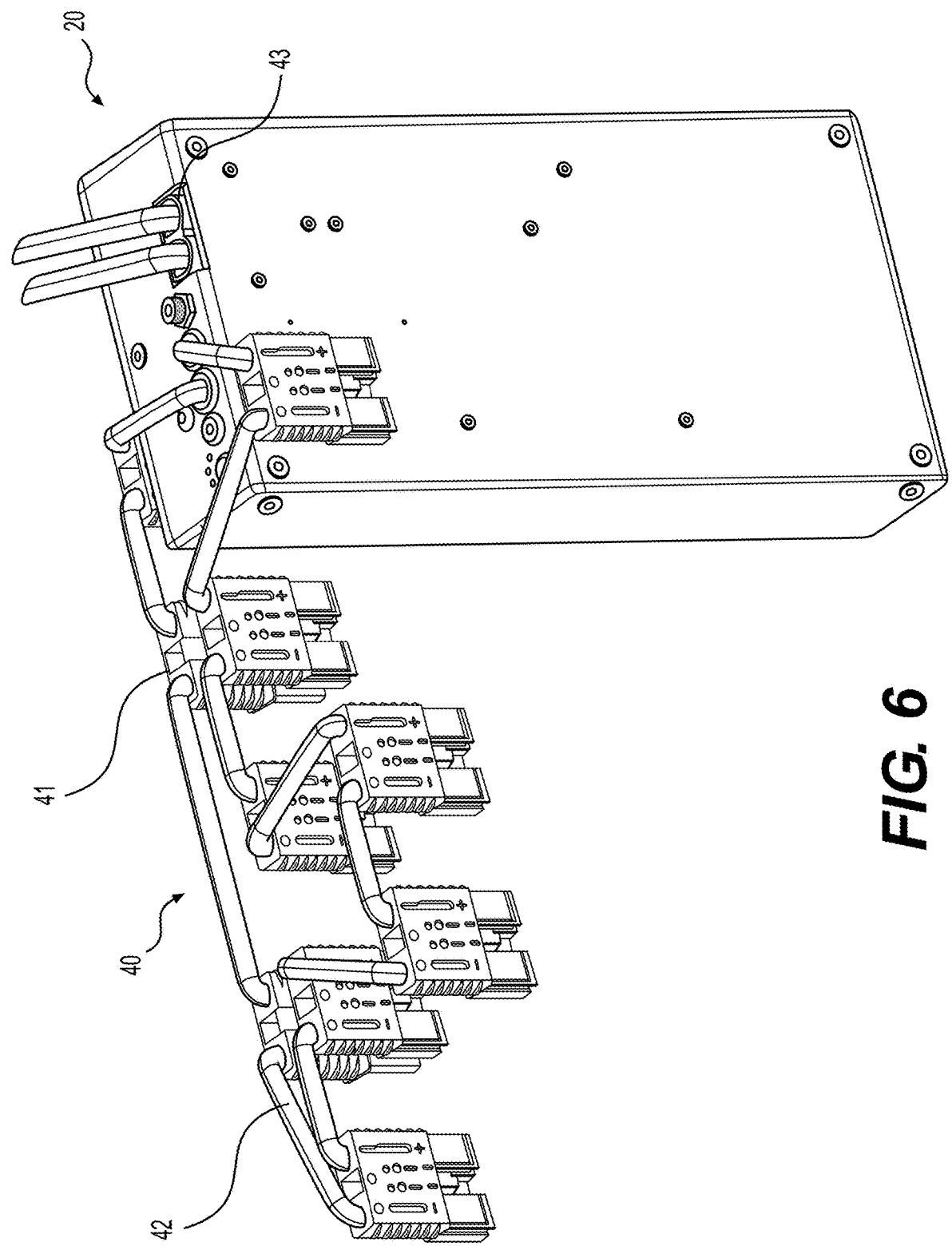
FIG. 6 is a perspective view of a wiring harness, according to an example embodiment of the present disclosure.

FIG. 6 depicts a wiring harness 40 configured to connect the plurality of energy cells 10 and the at least one BMS cell 20. In the embodiment shown in FIG. 6, the wiring harness 40 includes a plurality of plugs 41 and wires 42 connecting the plugs 41. In one or more embodiments, including the embodiment shown in FIG. 6, the wiring harness 40 provides a series connection between the plugs 41 such that, when the plugs 41 are inserted into the plug receptacles 13 of the energy cells 10 (as shown in FIG. 2), the energy cells 10 are connected in series. The plugs 41 carry the voltage to and from the BMS cell 20, and in one or more embodiments, the wiring harness 40 includes from three to twenty-two plugs. In embodiments, the plugs 41 are connected in series; however, in other embodiments, all or a subset of the plugs 41 may be connected in parallel. Additionally, FIG. 6 depicts an output connector 43 configured to carry the electrical energy to the system powered by the battery system 50.

Figure 7:
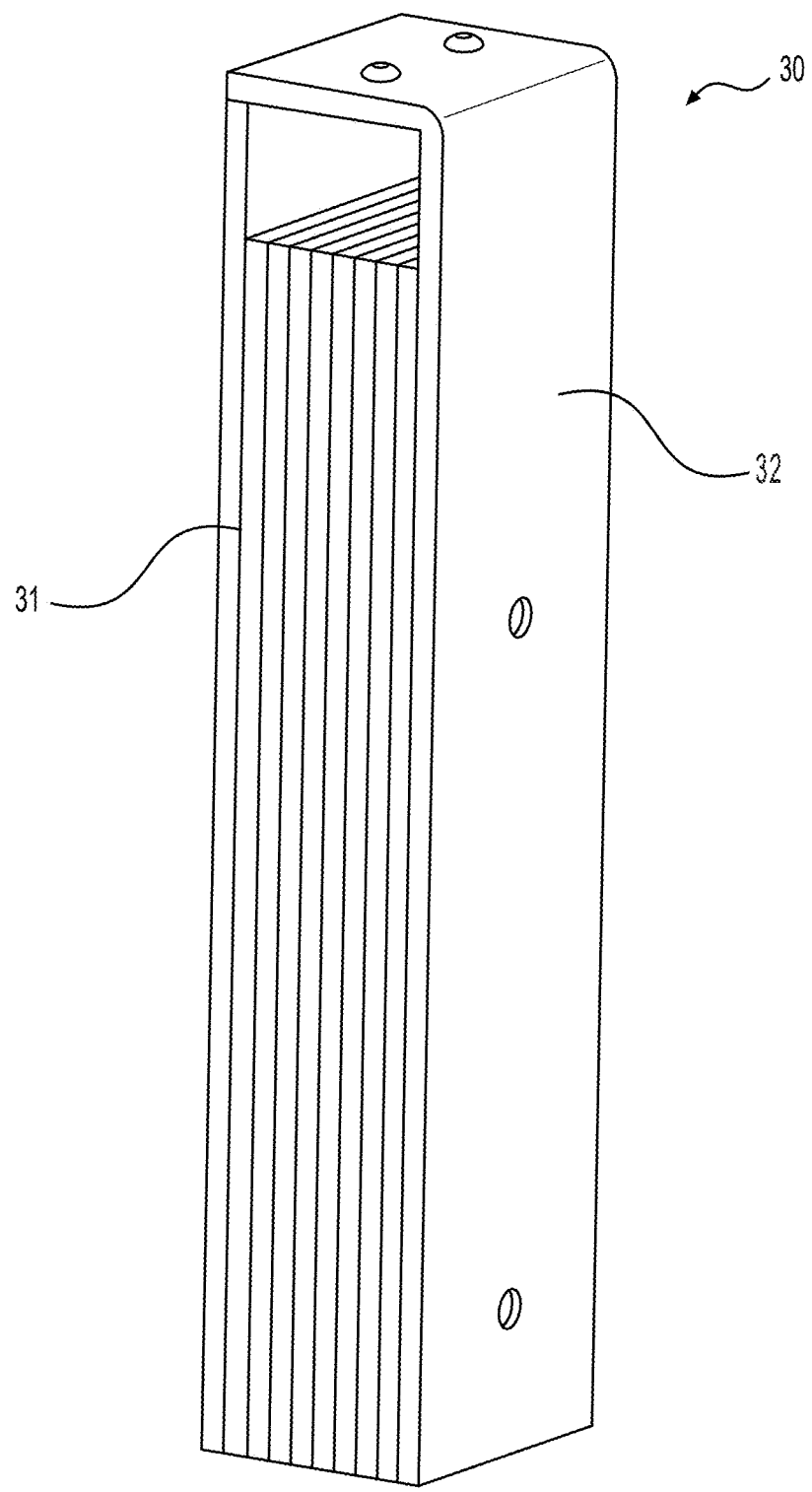
FIG. 7 is a perspective view of a ballast cell, according to an example embodiment of the present disclosure.

FIG. 7 depicts an embodiment of a ballast element. In particular, FIG. 7 depicts a ballast element in the form of a ballast cell 30 that is separate from the energy cells 10, BMS cell 20, and casing 60. In one or more embodiments, the ballast cell 30 includes an exterior case 32. In certain embodiments, the exterior case 32 is designed to fit in spaces between or around the energy cells 10 and BMS cell 20. Disposed within the exterior case 32 are a plurality of ballast plates 31. The number and material of the plates may be selected based on the desired amount of ballasting to be provided by the ballast cell 30. For example, in embodiments, the ballast plates 31 may be made from steel.

Referring back to FIGS. 1A-1E, the battery system 50 includes a plurality of energy cells 10, a BMS cell 20, and (optionally) a plurality of ballast cells 30. As can be seen, the cells 10, 20, 30 in FIGS. 1A-1D are arranged in a grid pattern with the cells 10, 20, 30 organized into a plurality of rows and columns. As shown in FIG. 1A, the battery system 50 includes rows having three cells and columns having six cells. In FIG. 1A, a first row includes two ballast cells 30 around a single energy cell 10. The second row includes three energy cells 10. The third row includes two energy cells 10 and one ballast cell 30. The fourth row also includes two energy cells 10 and one ballast cell 30, but the ballast cell 30 is on the opposite side of the row as compared to the third row. The fifth row includes two energy cells 10 disposed on either side of half of the BMS cell 20, and the sixth row includes two ballast cells 30 disposed on either side of the other half of the BMS cell 20. Thus, in the embodiment shown in FIG. 1A, the energy cells 10 and the ballast cells 30 are approximately the same size (i.e., have substantially the same height, width, and length), and the BMS cell 20 is twice the size of the energy cells 10 and the ballast cells 30 (in particular, twice the length or width but having the same height).

The plurality of energy cells 10, the at least one BMS cell 20, and the ballast cells 30 are individually insertable and removable from the casing 60 without inserting or removing any of the other of the plurality of energy cells 10, the at least one BMS cell 20, and the ballast cells 30. In other words, the plurality of energy cells 10, the at least one BMS cell 20, and the ballast cells 30 are only connected by the wiring harness 40 and frictional engagement between the exterior cases of the cells 10, 20, 30. Advantageously, because the exterior cases of the cells 10, 20, 30 are not interconnected, the placement of the cells 10, 20, 30 in the casing 60 can be customized for particular applications (such as, for example, to place the output connector 43 in a certain position within the battery system 50 or to distribute the ballast weight over a particular area) by inserting and arranging the desired number of cells 10, 20, 30 within the casing 60.

Figure 1E:
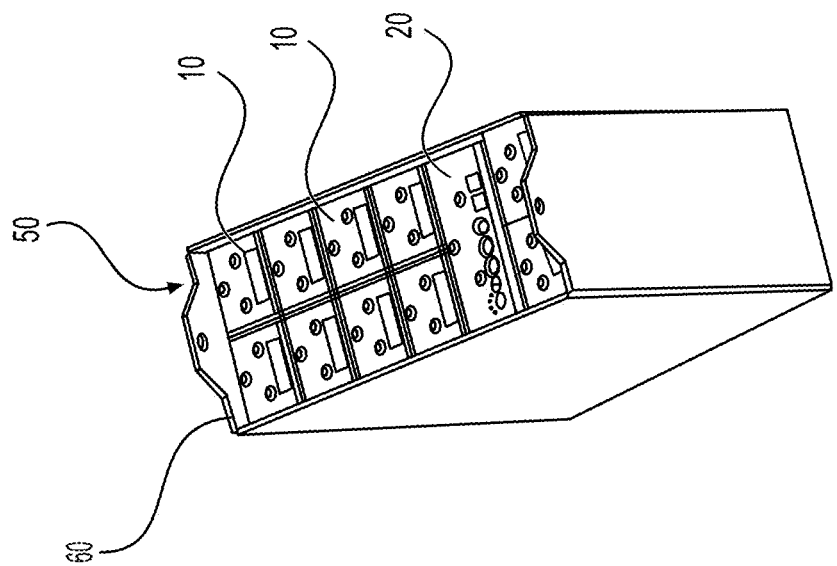
Figure 1D:
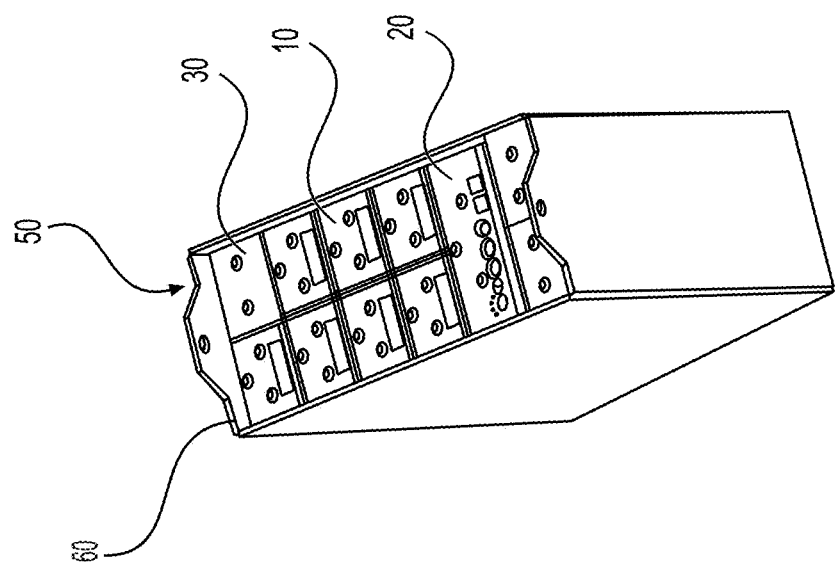

FIG. 1E depicts a battery system 50 including only the plurality of energy cells 10 and the at least one BMS cell 20. That is, the battery system 50 of FIG. 1E does not include a ballast element (other than the weight of the cells 10, 20 and the casing 60). Such battery systems 50 may be used for applications in which a counterweight is not needed, such as stationary energy storage or for certain autonomous guided vehicles. Such a battery system 50 has the many of the same advantages as described above, including the high customizability and ease of arrangement of the cells 10, 20 within the casing 60.

Figure 10:
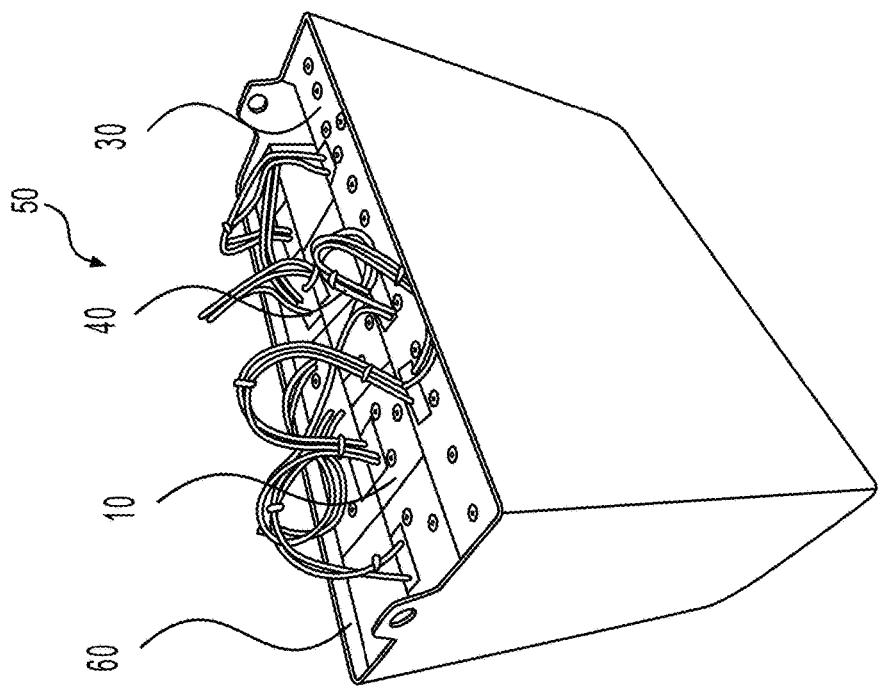
FIGS. 8-10 are photographs of components of the battery system, according to example embodiments of the present disclosure.
Figure 9:
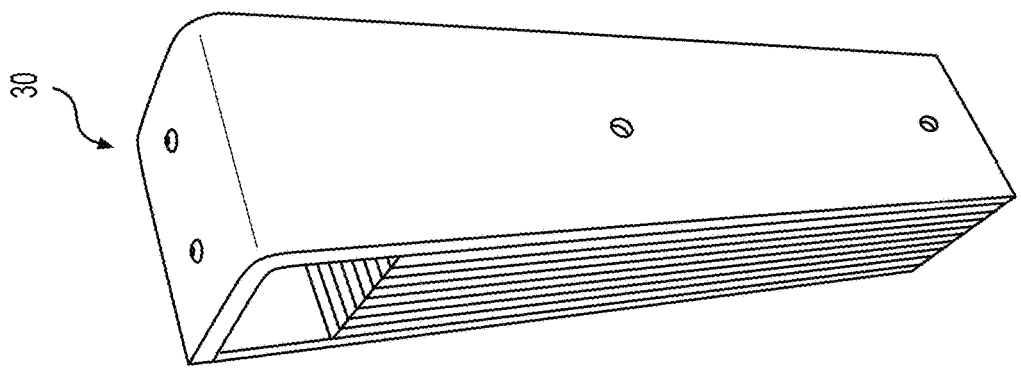
Figure 8:
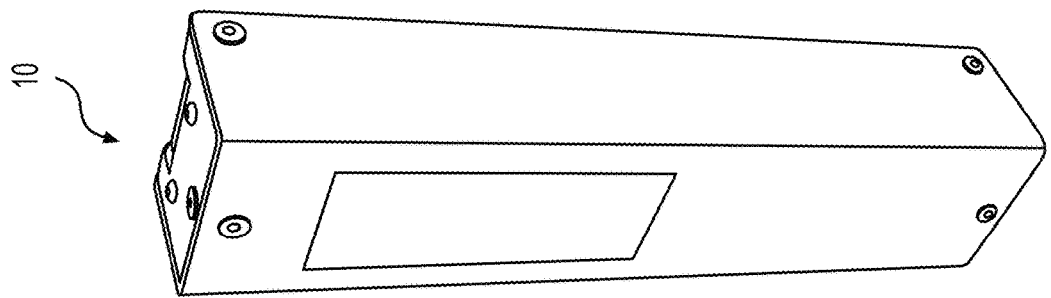

FIG. 8 depicts an embodiment of an energy cell 10 according to the present disclosure and produced by the assignee of the present disclosure. FIG. 9 depicts an embodiment of a ballast cell 30 according to the present disclosure and produced by the assignee of the present disclosure. FIG. 10 depicts an embodiment of a casing 60 containing a plurality of energy cells 10 and ballast cells 30 in which the energy cells 10 are connected by a wiring harness 40. The casing 60 of FIG. 10 did not yet have a BMS cell 20 inserted therein at the time the picture was taken. The casing 60, energy cells 10, ballast cells 30, and wiring harness 40 are assembled by the assignee of the present disclosure.

Figure 11D:
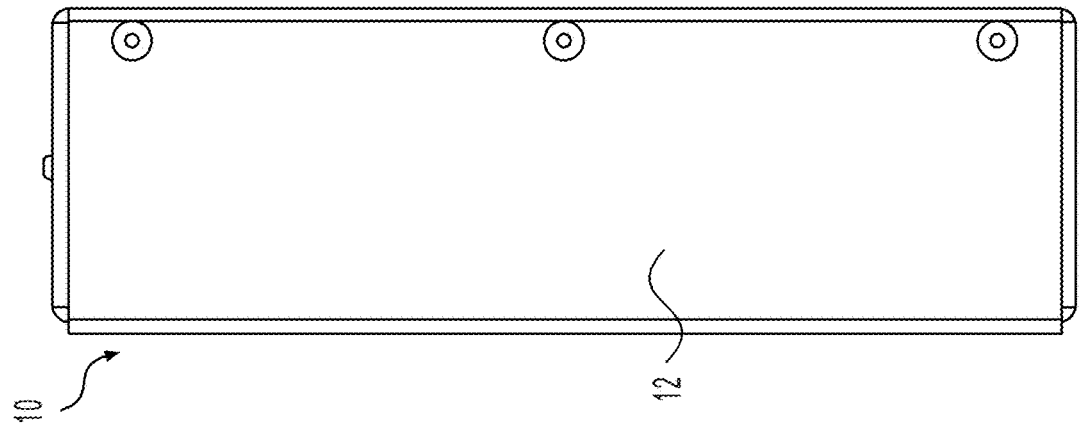

Referring now to FIGS. 11A-11D, another embodiment of an energy cell 10 is depicted. In such embodiments, the energy cell 10 is substantially the same as the energy cell 10 of FIGS. 2 and 3, but the energy cell 10 of FIGS. 11A-11D includes a ballast element within the protective case 12. As shown in FIG. 11A, the energy cell 10 includes a plugging point 11 and a protective case 12. In the embodiment depicted, the size of the cell 10 defined by the protective case 12 is larger than the previously described and depicted embodiments of the energy cell 10. FIG. 11B depicts a first cross-sectional view of the energy cell 10 in which the lithium ion cell module 62 can be seen. Further, as shown in FIG. 11B, the lithium ion cell module 62 is surrounded by a plurality of ballast weights 65. In embodiments, the exterior case 12 of the energy cell 10 includes a first face and a second face that is spatially disposed from the first face. The faces of the energy cell 10 are connected by four sides as shown in FIGS. 11A-11D. The ballast weight 65 may be provided on at least two of the four sides of the exterior case 12. In particular embodiments, no weight is provided on the side of the exterior case 12 providing an opening for the plug receptacle 13.

Figure 11C:
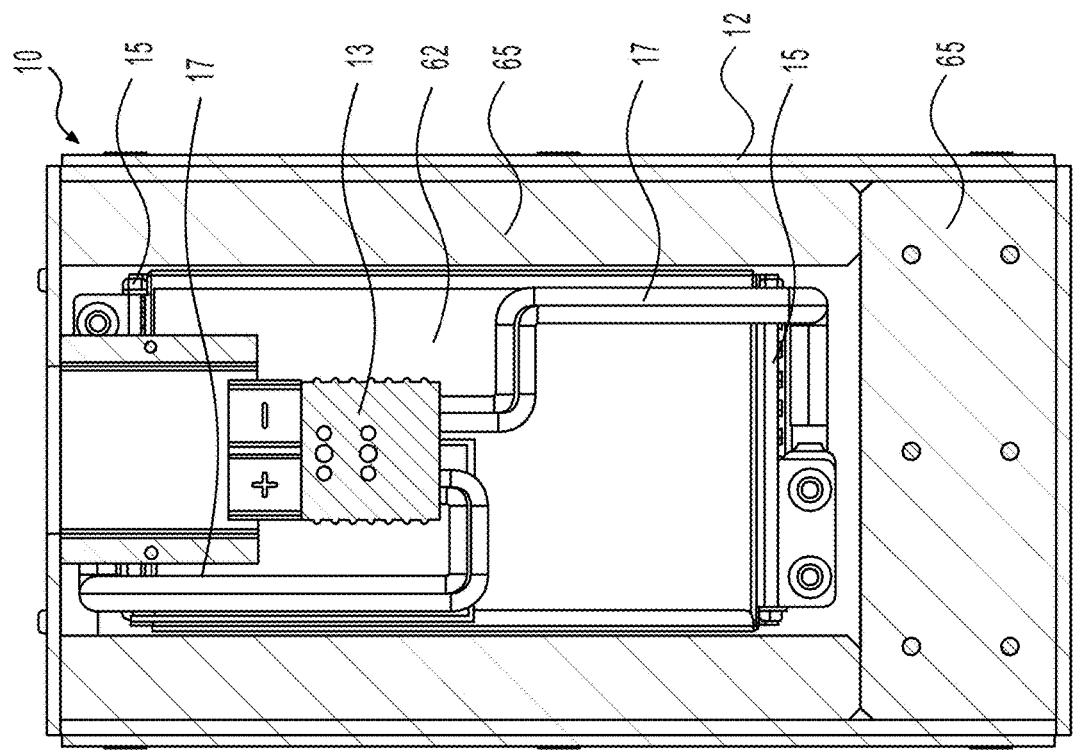

FIG. 11C depicts another cross-sectional view of the energy cell 10 in which the electrical connections can be seen. In particular, the plug receptacle 13 is connected to a first terminal wire 16 leading to the first battery terminal 15, and the plug receptacle 13 is also connected to a second terminal wire 18 leading to the second battery terminal 17. Disposed between the battery terminals 15, 17 are a plurality of lithium ion cell modules 62. The cell module, containing the lithium-ion cells and additional weight, are connected to the battery system 50. Energy cells 10 constructed according to the concepts illustrated in FIGS. 11A-11D provide energy to connected equipment, while the additional weight added to the energy cell 10 provides counter ballast for equipment. Optionally, the cell can be connected into a battery system that is then connected to equipment not requiring counterweight.

Figure 12A:
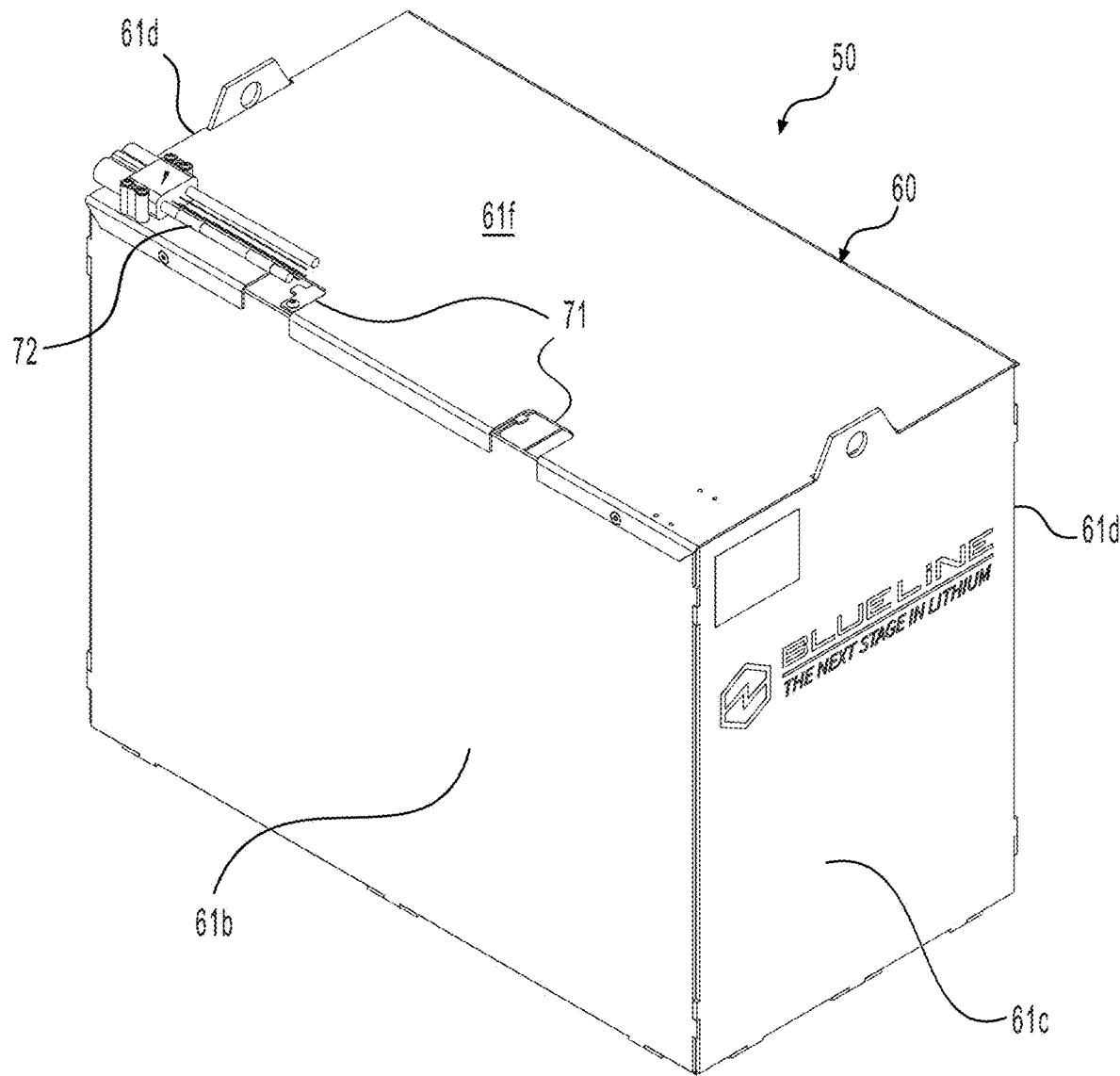

FIGS. 12A-12E depict another embodiment of the battery system 50. FIG. 12A is a perspective view of the battery system 50. As can be seen in FIG. 12A, the casing 60 includes an optional top wall 61f In the embodiment depicted, the top wall 61f is reversibly joined to two of the side walls 61b, 61d using, e.g., fasteners, such as screws.

Further, in embodiments, the top wall 61f includes openings 71 through which a charging/discharging cable 72 extends. In the embodiment shown in FIG. 12A, the top wall 61f includes two openings 71, which allow for separate charging and discharging cables to extend through the top wall 61f.

FIGS. 12B and 12C depict a front view and a side view, respectively, of the battery system 50. FIG. 12B shows a front side wall 61a of the casing 60, and the opposing rear side wall 61c is substantially similar to the front side wall 61a. FIG. 12C depicts a first lateral side wall 61b, and the opposing second lateral side wall 61d is substantially similar to the first lateral side wall 61b. In one or more embodiments, the top wall 61f includes a lip 73 that extends over the first and second lateral side walls 61b, 61d of the casing but not over the front and rear side walls 61a, 61c. As mentioned, the top wall 61f is secured to the lateral side walls 61b, 61d using one or more fasteners, and in particular, FIG. 12C depicts the lip 73 of the top wall 61f secured to the first lateral side walls 61b using two screws 74, and the top wall 61f may be secured to the second lateral side wall 61d in the same way.

Figure 12D:
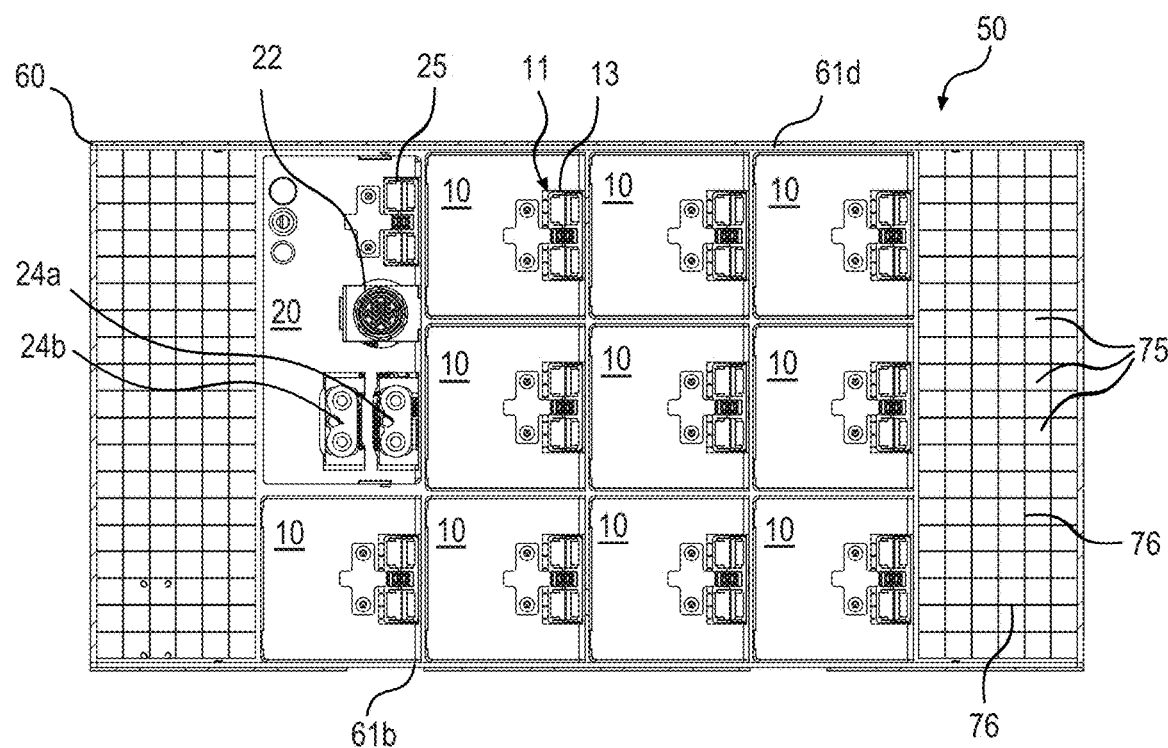

FIG. 12D depicts a top view of the battery system 50 without the top wall 61f. As can be seen in FIG. 12D, the casing 60 holds a plurality of energy cells 10 and a BMS cell 20. While not depicted, the plurality of energy cells 10 and the BMS cell 20 can be connected with a wiring harness 40 (such as shown in FIG. 6). The BMS cell 20 includes separate power input (charging) and power output (discharging) ports 24a, 24b. Further, the BMS cell 20 includes a data connection port 22 for obtaining diagnostic and performance information from the battery management system control board 63 and a battery port 25 for connecting to the plurality of energy cells 10. Further, the plurality of energy cells 10 include plugging points 11 with plug receptacles 13 for connecting to the wiring harness (not shown).

In FIG. 12D further depicts the ballast element of the battery system 50 in the form of a plurality of ballast bars 75. In one or more embodiments, the ballast bars 75 comprise a material having a density sufficient to provide the desired ballasting effect within the space constraints of the casing 60, such as, for example, steel. In one or more such embodiments, the ballast bars 75 have a cross-sectional dimension of 1 inch by 1 inch and a length up to the height of the lateral side walls 61b, 61d. In the embodiment shown in FIG. 12D, the ballast bars 75 are positioned on either side of a central block of the plurality of energy cells 10 and the BMS cell 20. In the example embodiment shown in FIG. 12D, the ballast bars 75 are arranged in six columns of nineteen ballast bars 75 on each side for a total of 288 ballast bars 75. In this way, the ballast bars 75 can provide, e.g., 2000 lbs of ballasting weight or more. In one or more other embodiments, the ballast bars 75 can be interspersed among the plurality of energy cells 10 and the BMS cell 20.

By providing a plurality of ballast bars 75 as the ballasting element of the battery system 50, the ballasting weight of the battery system 50 can be tailored to the particular needs of the installation powered by the battery system 50. For example, once the desired ballasting weight is achieved with the ballasting bars 75, the remainder of the space in the interior cavity of the casing 60 can be filled with low density materials, such as plastic or wood, which act as shims to prevent movement of the ballast bars 75. Further, in one or more embodiments, the interior cavity of the casing 60 may be provided with panels 76 of, e.g., a low density material, such as a plastic material, to define layers in which the ballast bars 75 can be inserted. In one or more embodiments, the panels 76 may intersect to define a grid having slots configured to hold one or a subset of ballast bars 75.

Figure 12E:
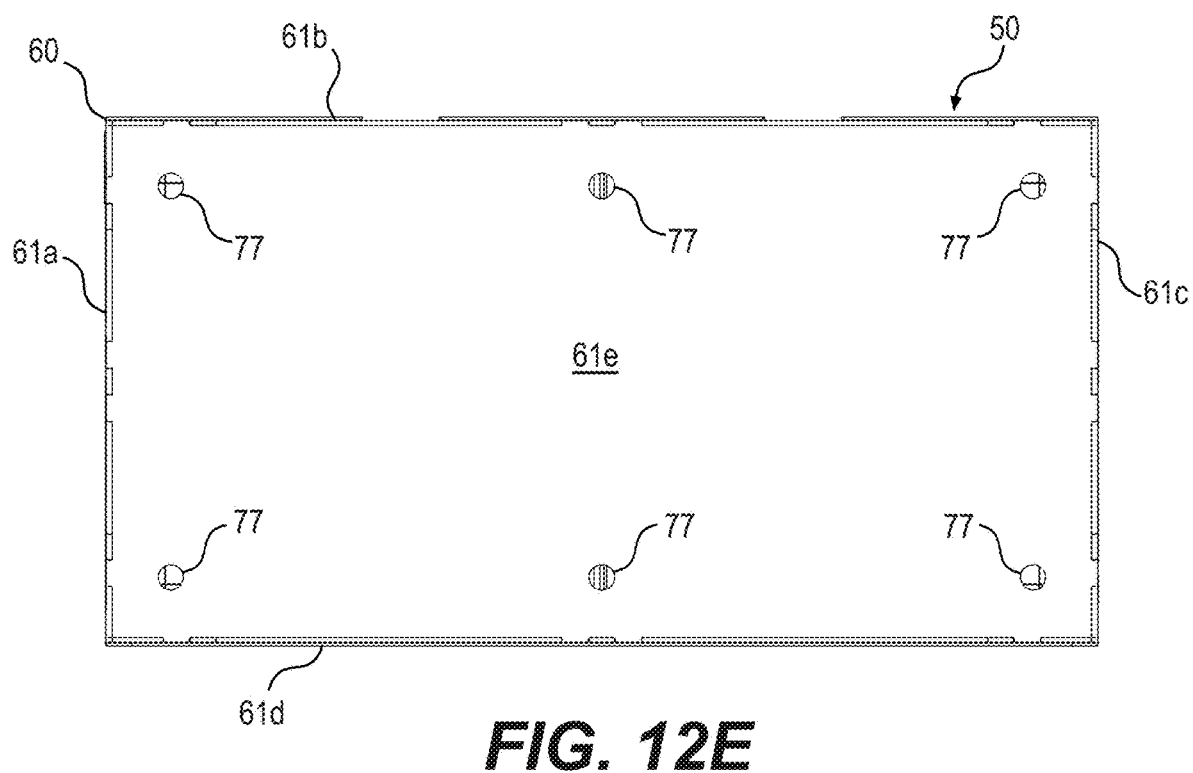

FIG. 12E depicts the bottom wall 61e of the casing 60. In one or more embodiments, the bottom wall 61e includes a plurality of apertures 77 that allow for draining of moisture or circulation of air through the battery system 50.

A method of making the presently disclosed modular battery system 50 may include fabricating the metal components of the cells 10, 20, 30 and casing 60 with traditional metal-cutting and metal-forming processes. The cells 10, 20, 30 and casing 60 are then assembled with hand tools or automated processes, using a combination of fasteners and, potentially but not necessarily, having a welding process to join weights and/or the outer cell casing together.

A method of using the present disclosed modular battery system 50 may include inserting the energy cells 10 together with a BMS cell 20 and the ballast element within a casing 60. The wiring harness 40 electrically connects the energy cells 10 and BMS cells 20. The battery system 50 would then be connected to equipment that requires electrical power. The battery system 50, in accordance with the present disclosure, provides both electrical energy and, optionally, counter ballasting weight to the equipment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A modular battery, comprising:
a casing having sidewalls and a bottom wall defining an interior cavity;
a plurality of energy cells disposed within the interior cavity, each energy cell of the plurality of energy cells comprising at least one lithium ion cell module;
at least one battery management system (BMS) cell disposed within the interior cavity, the at least one BMS cell being configured to coordinate input of electrical energy into and output of electrical energy from the plurality of energy cells;
a wiring harness electrically connecting the plurality of energy cells and the at least one BMS cell; and
wherein each energy cell of the plurality of energy cells and each BMS cell of the at least one BMS cell are individually insertable and removable from the interior cavity without insertion or removal of any other energy cell of the plurality of energy cells or any other BMS cell of the at least one BMS cell;
wherein each of the plurality of energy cells and the at least one BMS cell comprises an exterior case and each exterior case is in frictional engagement with a respective exterior case of one or more adjacent cells, each of the one or more adjacent cells being selected from a group consisting of an energy cell, a BMS cell, and a ballast cell; and
wherein the modular battery further comprises ballast weight disposed within at least one energy cell of the plurality of energy cells.

2. The modular battery of claim 1, further comprising a plurality of ballast cells.

3. The modular battery of claim 2, wherein each ballast cell of the plurality of ballast cells comprises a first width, a first length, and a first height, and wherein each energy unit of the plurality of energy cells comprises a second width, a second length, and a second height, and wherein the first width is substantially equal to the second width, the first length is substantially equal to the second length, and the first height is substantially equal to the second height.

4. The modular battery of claim 2, wherein the plurality of energy cells, the at least one BMS cell, and the plurality of ballast cells are arranged in a plurality of rows and columns within the interior cavity.

5. The modular battery of claim 1, wherein the wiring harness connects the plurality of energy cells and the at least one battery management system cell in series.

6. The modular battery of claim 1, wherein each energy cell of the plurality of energy cells comprises at least two lithium ion cell modules connected in parallel.

7. The modular battery of claim 1, wherein the at least one energy cell comprises an exterior case and wherein the ballast weight is disposed on an interior of the exterior case.

8. The modular battery of claim 1, further comprising a plurality of ballast bars disposed within the interior cavity around or among the plurality of energy cells and the at least one battery management system cell.

9. An energy cell, comprising:
an exterior case having an interior;
at least one lithium ion cell module disposed on the interior of the exterior case;
ballast weight disposed on the interior of the exterior case and around the at least one lithium ion cell module; and
a plug receptacle having an opening extending through the exterior case, wherein the plug receptacle is in electrical communication with battery terminals of the at least one lithium ion cell;
wherein the at least one lithium ion cell module comprises a plurality of lithium ion cell modules connected in parallel to the battery terminals.

10. The energy cell of claim 9, wherein the exterior case comprises a first face, a second face, and four sides, wherein the first face is parallel to and spatially disposed from the second face, wherein the four sides connect the first face to the second face, wherein the opening extends through a first side of the four sides, and wherein the ballast weight is disposed around the at least one lithium ion cell module on at least two sides of the four sides but not on the first side.

11. A method of assembling a modular battery, comprising:
inserting a plurality of energy cells and at least one battery management system (BMS) cell in an interior cavity of a casing, wherein each energy cell of the plurality of energy cells comprises at least one lithium ion cell module and wherein the at least one BMS cell is configured to coordinate input of electrical energy into and output of electrical energy from the plurality of energy cells;
connecting the plurality of energy cells and the at least one BMS cell with a wiring harness;
wherein each energy cell of the plurality of energy cells and each BMS cell of the at least one BMS cell are individually insertable in the interior cavity;
wherein each of the plurality of energy cells and the at least one BMS cell comprises an exterior case and each exterior case is in frictional engagement with a respective exterior case of one or more adjacent cells, each of the one or more adjacent cells being selected from a group consisting of an energy cell, a BMS cell, and a ballast cell; and
wherein the modular battery further comprises ballast weight disposed within at least one energy cell of the plurality of energy cells.

12. The method of claim 11, wherein the modular battery further comprises a plurality of ballast cells and wherein inserting further comprises:
arranging the plurality of energy cells, the at least one battery management cell, and the plurality of ballast cells in a plurality of rows and columns within the interior cavity.

13. The method of claim 11, wherein connecting further comprises connecting the plurality of energy cells and the at least one battery management cell in series.

14. The method of claim 11, wherein the at least one energy cell comprises an exterior case and wherein the ballast weight is disposed on an interior of the exterior case.

15. The method of claim 11, wherein the modular battery further comprises a plurality of ballast bars and wherein inserting further comprises arranging the plurality of ballast bars around or among the plurality of energy cells and the at least one battery management system cell.

16. A method of assembling a modular battery, comprising:
inserting a plurality of energy cells and at least one battery management system (BMS) cell in an interior cavity of a casing, wherein each energy cell of the plurality of energy cells comprises at least one lithium ion cell module and wherein the at least one BMS cell is configured to coordinate input of electrical energy into and output of electrical energy from the plurality of energy cells;
connecting the plurality of energy cells and the at least one BMS cell with a wiring harness;

wherein each energy cell of the plurality of energy cells and each BMS cell of the at least one BMS cell are individually insertable in the interior cavity;

wherein each of the plurality of energy cells and the at least one BMS cell comprises an exterior case and each exterior case is in frictional engagement with a respective exterior case of one or more adjacent cells, each of the one or more adjacent cells being selected from a group consisting of an energy cell, a BMS cell, and a ballast cell;

wherein the modular battery further comprises a plurality of ballast bars and wherein inserting further comprises arranging the plurality of ballast bars around or among the plurality of energy cells and the at least one battery management system cell; and wherein inserting further comprises inserting a plurality of panels between layers of the plurality of ballast bars.

\* \* \* \* \*